United States Patent

Iwasaki

(10) Patent No.: US 9,538,145 B2
(45) Date of Patent: Jan. 3, 2017

(54) IMAGE CAPTURE APPARATUS, METHOD FOR SETTING MASK IMAGE, AND RECORDING MEDIUM

(71) Applicant: CANON KABUSHIKI KAISHA, Tokyo (JP)

(72) Inventor: Takahiro Iwasaki, Kiyose (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/065,229

(22) Filed: Oct. 28, 2013

(65) Prior Publication Data

US 2014/0118545 A1 May 1, 2014

Related U.S. Application Data

(63) Continuation of application No. PCT/JP2013/063243, filed on May 13, 2013.

(30) Foreign Application Priority Data

May 21, 2012 (JP) ................................. 2012-115763

(51) Int. Cl.
*H04N 7/18* (2006.01)
*G08B 13/196* (2006.01)
(Continued)

(52) U.S. Cl.
CPC ........ *H04N 7/183* (2013.01); *G08B 13/19686* (2013.01); *H04N 7/185* (2013.01); *H04N 21/2187* (2013.01); *H04N 21/4312* (2013.01)

(58) Field of Classification Search
CPC ................. G08B 13/19686; H04N 21/3872; H04N 21/4542
(Continued)

(56) References Cited

U.S. PATENT DOCUMENTS

2008/0036877 A1* 2/2008 Arima .................... H04N 7/18
348/231.8

FOREIGN PATENT DOCUMENTS

| JP | 2012-019466 A | 1/2012 |
| JP | 2012-089958 A | 5/2012 |
| JP | 2013-026642 A | 2/2013 |

OTHER PUBLICATIONS

"ONVIF Specification map"; http://www.onvif.org/specs/DocMap.html; version 2.2.1.

* cited by examiner

*Primary Examiner* — Andy Rao
*Assistant Examiner* — Obafmei Sosanya
(74) *Attorney, Agent, or Firm* — Canon USA, Inc. I.P. Division

(57) ABSTRACT

A transmission apparatus that transmits an image to be distributed to a reception apparatus includes a holding unit configured to hold a plurality of settings that include resolution of a captured image and that are used for generating the image to be distributed, a reception unit configured to receive, from the reception apparatus, specification information for specifying one of the plurality of held settings in relation to superimposition of the mask image and superimposition information indicating a position at which the mask image is superimposed upon the image to be distributed generated in accordance with the one of the settings specified by the specification information, and a setting unit configured to set a position at which the mask image is superimposed upon the captured image on the basis of the specified one of the settings and the superimposition information received by the reception unit.

12 Claims, 12 Drawing Sheets

(51) Int. Cl.
*H04N 21/2187* (2011.01)
*H04N 21/431* (2011.01)

(58) Field of Classification Search
USPC .......................................................... 348/143
See application file for complete search history.

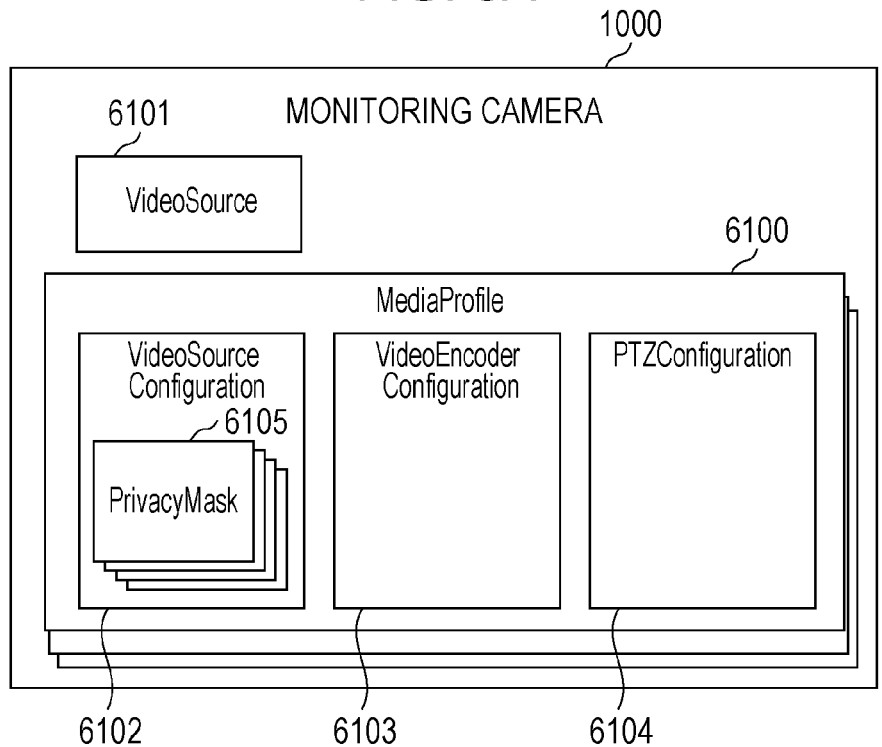
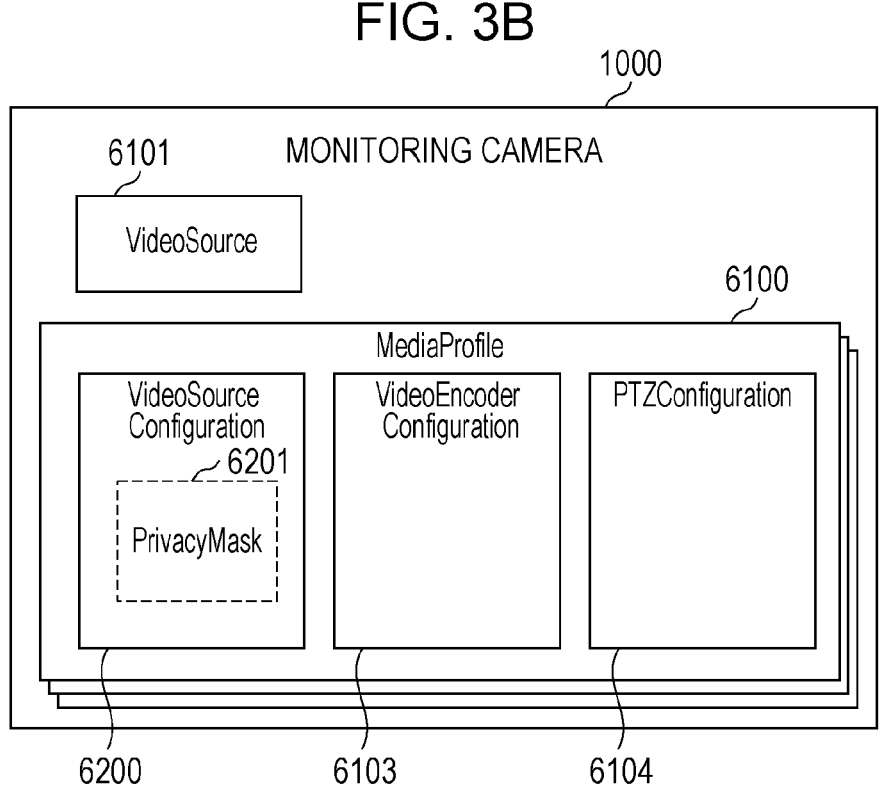

IMAGE CAPTURE APPARATUS, METHOD FOR SETTING MASK IMAGE, AND RECORDING MEDIUM

CROSS-REFERENCE TO RELATED APPLICATIONS

This application is a Continuation of International Patent Application No. PCT/JP2013/063243, filed May 13, 2013, which claims the benefit of Japanese Patent Application No. 2012-115763, filed May 21, 2012, both of which are hereby incorporated by reference herein in their entirety.

TECHNICAL FIELD

The present invention relates to an image capture apparatus capable of distributing a captured image, and, more particularly, to a function of masking an image to be distributed by the image capture apparatus.

BACKGROUND ART

Currently, a mask processing function for making it impossible to identify a region of a captured image at a distribution destination is provided. The mask processing function may be a function such as, for example, a process for blacking out a target region using OSD (on-screen display), a process for decreasing the image quality of the target region, or a filtering process.

On the other hand, a common standard established by the ONVIF is known as a standard protocol for standardizing a communication interface between a network camera and an external apparatus connected to the network camera through a network (NPL 1). The ONVIF is an acronym for Open Network Video Interface Forum.

In the common standard established by the ONVIF, camera parameters that may be set for the network camera are defined.

For example, the common standard established by the ONVIF defines a media profile. The media profile is configured by a set of media configurations. The media profile is used by a client to set the property of a media stream using a device. The media profile includes, for example, the following setting values: video source configuration; audio source configuration; video encoder configuration; audio encoder configuration; PTZ configuration; video analytics configuration; metadata configuration; audio output configuration; and audio decoder configuration. For example, the video source configuration includes references of a video source and bounds that define an image to be transmitted to the client as a stream.

CITATION LIST

Non Patent Literature

NPL 1 ONVIF Specification (http://www.onvif.org/specs/DocMap.html)

An object of the present invention is to propose an image capture apparatus, a method for capturing an image, and a recording medium that are suitable to superimpose a mask image upon a captured image using camera parameters used for generating the captured image and parameters for setting a mask.

SUMMARY OF INVENTION

In order to solve the above problem, a transmission apparatus in the present invention is a transmission apparatus that transmits an image to be distributed, which is part or entirety of a captured image, to a reception apparatus. The transmission apparatus includes a holding unit configured to hold a plurality of settings that include resolution of the captured image and that are used for generating the image to be distributed, a reception unit configured to receive, from the reception apparatus, specification information for specifying one of the plurality of held settings in relation to superimposition of the mask image and superimposition information indicating a position at which the mask image is superimposed upon the image to be distributed generated in accordance with the one of the settings specified by the specification information, and a setting unit configured to set a position at which the mask image is superimposed upon the captured image on the basis of the specified one of the settings and the superimposition information received by the reception unit.

Detailed configuration of the present invention will be described with reference to the accompanying drawings and the following embodiments.

Further features of the present invention will become apparent from the following description of exemplary embodiments with reference to the attached drawings.

BRIEF DESCRIPTION OF DRAWINGS

FIGS. 3A and 3B illustrate the structure of parameters.

DESCRIPTION OF EMBODIMENTS

Embodiments of the present invention will be described hereinafter.

First Embodiment

Figure 1A:
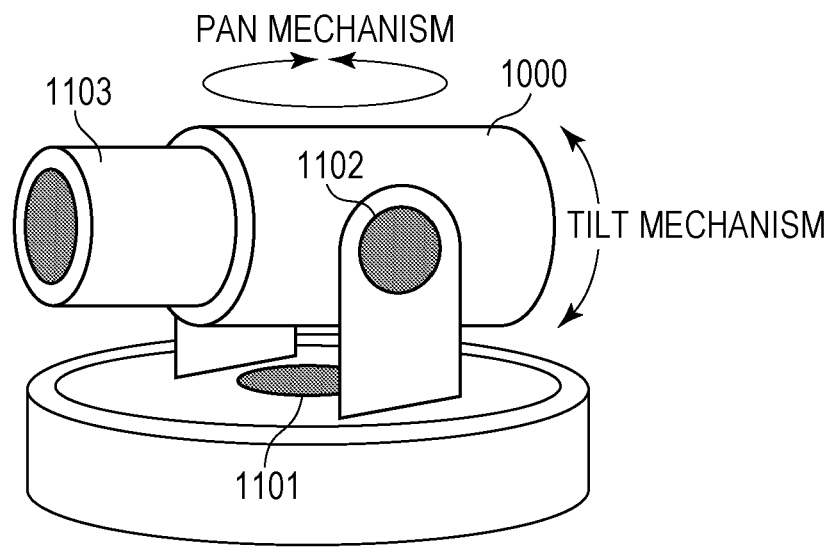
FIGS. 1A and 1B illustrate the appearance of a system.

FIG. 1A is a diagram illustrating a security camera (image capture apparatus) according to an embodiment of the present invention. 1101 denotes a mechanism that moves a lens in a pan direction, 1102 denotes a mechanism that moves the lens in a tilt direction, and 1103 denotes a zoom mechanism.

Figure 1B:
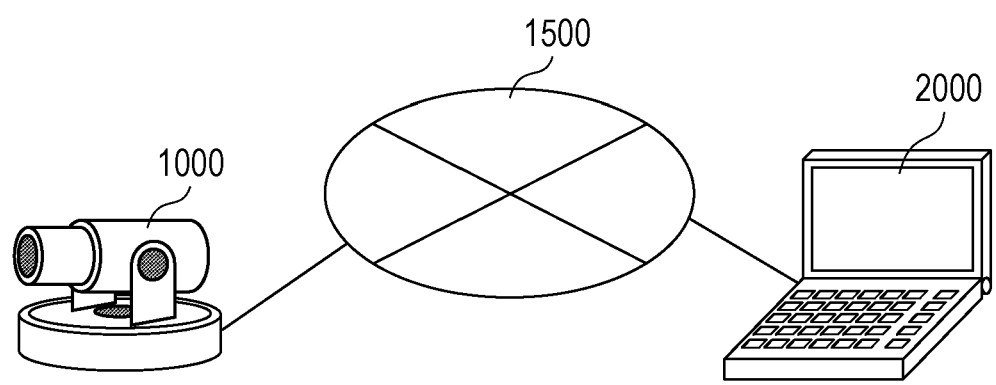

FIG. 1B is a diagram illustrating the configuration of a system including a monitoring camera (image capture apparatus) 1000. 2000 denotes a client apparatus, which is an external device in the present invention. The monitoring camera 1000 and the client apparatus 2000 are connected to each other through an IP network 1500 such that the monitoring camera 1000 and the client apparatus 2000 are able to communicate with each other. The monitoring camera 1000 transmits and receives data in accordance with an ONVIF specification. The client apparatus 2000 transmits, to the monitoring camera 1000, various commands such as a change of an image capture parameter, driving of a pan head, and start of video streaming, which will be described later. The monitoring camera 1000 transmits responses to these commands and video streaming to the client apparatus 2000. The monitoring camera 1000 transmits an image to be distributed, which is part or the entirety of a captured image, to a reception apparatus.

Figure 2:
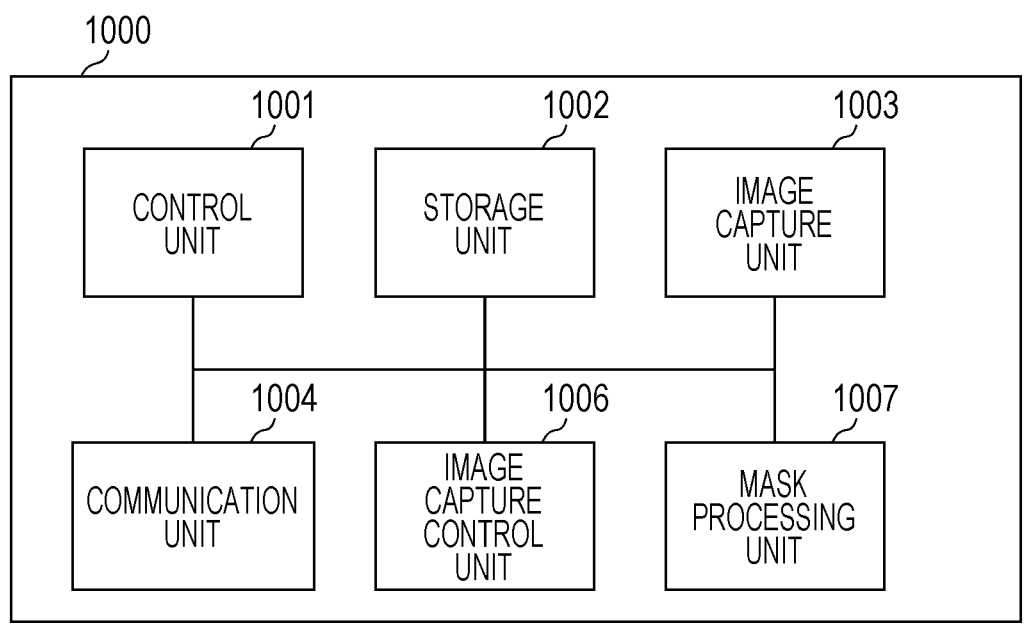
FIG. 2 is a block diagram.

FIG. 2 is a diagram illustrating the internal configuration of the security camera (image capture apparatus) according to this embodiment.

In FIG. 2, 1001 denotes a control unit that controls the entirety of the monitoring camera 1000. The control unit 1001 controls a mask processing unit 1007, which will be described later, and sets a position at which a mask image is superimposed upon a captured image on the basis of one of video source configurations specified by the client apparatus 2000 and superimposition information (mask 5004) received from the client apparatus 2000. The control unit 1001 is configured by, for example, a CPU, which is a computer.

1002 denotes a storage unit (memory). The storage unit 1002 is used as storage regions for various pieces of data that mainly include a storage region used for programs to be executed by the control unit 1001, a working region while the programs are being executed, and a storage region for image data generated by an image capture unit 1003, which will be described later. In the first embodiment, the storage unit 1002 holds a plurality of settings (video source configurations) that include the resolution of a captured image and that are used for generating an image to be distributed.

1003 denotes an image capture unit. The image capture unit 1003 converts an analog signal obtained by capturing an image of a subject into digital data, as well as generating image data regarding the captured image by performing a process for compressing data using an ADCT (adaptive discrete cosine transform) or the like and outputting the image data to the storage unit 1002. After outputting the captured image to the storage unit 1002, the image capture unit 1003 issues an image obtaining event to the control unit 1001.

1004 denotes a communication unit. The communication unit 1004 is used for receiving control commands from the external device or transmitting responses to the control commands to the external device. In the first embodiment, the communication unit 1004 receives specification information (video source configuration token) for specifying one of a plurality of held settings. In addition, the communication unit 1004 receives, from the client apparatus 2000, the superimposition information (mask 5004) indicating a position at which a mask image is superimposed upon an image to be distributed generated in accordance with the one of the settings specified by the specification information. The specification information and the superimposition information are received in relation to the superimposition of the mask image. For example, a mask generation command (create privacy mask command) including the specification information and the superimposition information is received from a client. Alternatively, for example, a video specification set command (set video configuration command) including the specification information and the superimposition information is received from the client.

1006 denotes an image capture control unit. The image capture control unit 1006 is used for controlling the pan mechanism 1101, the tilt mechanism 1102, and the zoom mechanism 1103 in accordance with values of pan angle, tilt angle, and zoom magnification input from the control unit 1001. In addition, the image capture control unit 1006 provides current values of pan angle, tilt angle, and zoom magnification in accordance with a request from the control unit 1001.

1007 denotes a mask processing unit. The mask processing unit 1007 stores the pan angle, the tilt angle, and the zoom magnification input from the control unit 1001 to identify the position of a mask, and the position of pixels of the mask in an image capture range of the image capture unit 1003 in corresponding pan, tilt, and zoom states. The mask processing unit 1007 then provides the mask at an appropriate position of image data output from the image capture unit 1003 on the basis of the latest pan angle, tilt angle, and zoom magnification. The mask processing unit 1007 includes a validation flag for each mask, and performs control such that a mask is not output when the flag indicates false.

Although the internal configuration of the monitoring camera 1000 has been described with reference to FIG. 2, the processing blocks illustrated in FIG. 2 describe an example of a security camera according to a preferred embodiment of the present invention, and the internal configuration is not limited to this. The internal configuration may be modified and altered in various ways without deviating from the scope of the present invention, such as by including an audio input unit.

The names and the content of commands, parameters, and the like used in this embodiment will be described hereinafter.

FIG. 3A illustrates the structure of parameters held by the monitoring camera 1000 according to this embodiment.

A media profile 6100 is a set of parameters for storing various setting items of the monitoring camera while associating the setting items with one another. The media profile 6100 holds a profile token, which is an ID of the media profile 6100, a video source configuration 6102, and a video encoder configuration 6103. Furthermore, the media profile 6100 holds a PTZ configuration 6104 and links to various setting items including an encoder of an image to be distributed and an encoder of sound. The storage unit 1002 holds a media profile including the video source configuration used for generating an image to be distributed, the PTZ configuration used for determining an image capture direction of the image capture unit that captures an image, and the like.

A video source 6101 is a group of parameters indicating the performance of an image capture sensor included in the monitoring camera. The video source 6101 includes a video source token, which is an ID of the video source 6101, and resolution indicating the resolution of image data that may be output by the image capture sensor.

The video source configuration 6102 is a group of parameters that associate the video source 6101 included in the monitoring camera with the media profile 6100. The video source configuration 6102 includes bounds that specify a portion of image data output from the video source 6101 to be extracted and used as an image to be distributed. Details of the bounds will be described later. Thus, the video source configuration 6102 includes references of a first parameter and a second parameter. The first parameter is the video source 6101 including the resolution of a captured image. The second parameter is the bounds indicating an extraction range in which an image to be distributed, which is to be transmitted to a client, is extracted from a captured image having resolution according to the first parameter.

The video encoder configuration 6103 is a group of parameters that associate settings relating to video compression with the media profile 6100. The monitoring camera

1000 distributes, to the client apparatus 2000, image data output on the basis of the content of the video source configuration 6102. The distribution is performed in accordance with a parameter such as a video compression method (for example, JPEG or H.264), a frame rate, or resolution set in the video encoder configuration 6103.

The PTZ configuration 6104 is a group of parameters that associate settings relating to the pan mechanism 1101, the tilt mechanism 1102, and the zoom mechanism 1103 of the monitoring camera 1000 with the media profile 6100. The PTZ configuration 6104 includes information regarding a coordinate system representing the actual value of pan angle, the actual value of tilt angle, and the actual value of zoom magnification in the pan mechanism, the tilt mechanism, and the zoom mechanism, respectively.

A privacy mask 6105 is a group of parameters that hold a list of parameters relating to a mask. The privacy mask 6105 includes a privacy mask token, which is an ID of the privacy mask 6105, a name, which is the name of a privacy mask construction, and a mask, which specifies the position and the size of the mask at three or more points using a polygon. Furthermore, the privacy mask 6105 includes an enabled flag, which specifies whether or not to display the mask on an image to be distributed, a color, which specifies the color of the mask, and PTZ designation, which identifies the position of the pan head.

The PTZ designation includes a PTZ configuration token that specifies the PTZ configuration 6104, which includes a definition of the coordinate system for representing the orientation (pan and tilt) of the pan head and the zoom magnification. Furthermore, the PTZ designation includes a position that specifies the orientation of the pan head and the zoom magnification using the coordinate system indicated by the specified PTZ configuration. The PTZ designation is used as positional information for identifying the position of a captured image in an image capture possible range, in which the image capture unit 1003 may capture an image.

Figure 5:
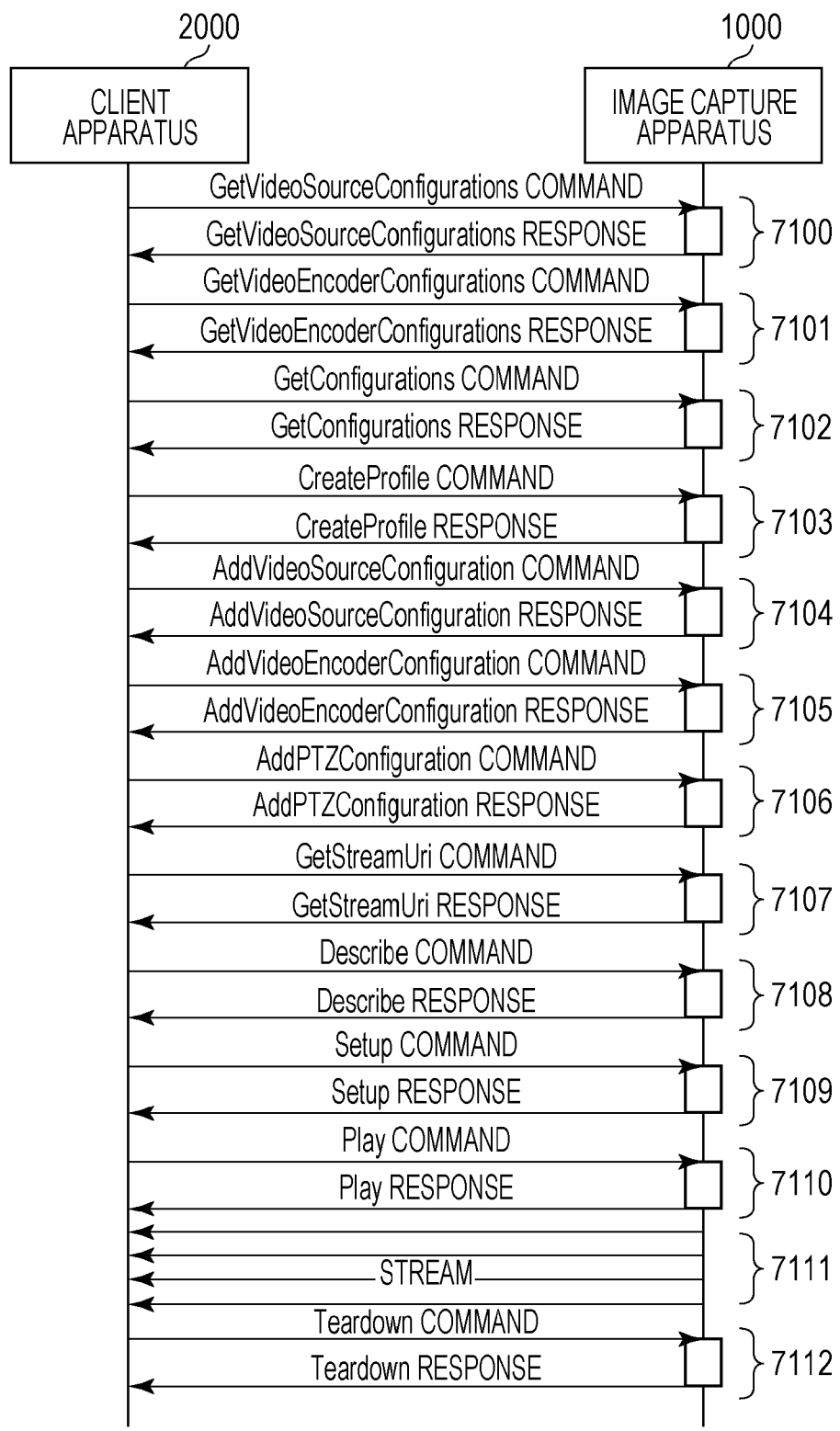
FIG. 5 is a diagram illustrating a command sequence.

FIG. 5 illustrates a typical command sequence between the monitoring camera 1000 and the client apparatus 2000 according to this embodiment from a beginning of setting to distribution of an image.

7100 denotes a transaction of a get video source configurations command. As a result of this command, the client apparatus 2000 obtains a list of video source configurations 6102 held by the monitoring camera 1000.

7101 denotes a transaction of a get video encoder configurations command. As a result of this command, the client apparatus 2000 obtains a list of video encoder configurations 6103 held held by the monitoring camera 1000.

7102 denotes a transaction of a get configurations command. As a result of this command, the client apparatus 2000 obtains a list of PTZ configurations 6104 held by the monitoring camera 1000.

7103 denotes a transaction of a create profile command. As a result of this command, the client apparatus 2000 creates a new media profile 6100 in the monitoring camera 1000 and obtains a profile token of the new media profile 6100.

7104, 7105, and 7016 denote transactions of an add video source configuration command, an add video encoder configuration command, and an add PTZ configuration command, respectively. As a result of these commands, the client apparatus 2000 associates the following configurations with a specified media profile. That is, the configurations associated with the media profile by these commands are a desired video source configuration, video encoder configuration, and PTZ configuration.

7107 denotes a transaction of a get stream URI command. As a result of this command, the client apparatus 2000 obtains an address (URI) for enabling the monitoring camera 1000 to obtain a distributed stream on the basis of the settings of the specified media profile.

7108 denotes a transaction of a describe command. By executing this command using the URI obtained in 7107, the client apparatus 2000 requests and obtains information regarding content distributed by the monitoring camera 1000 as a stream.

7109 denotes a transaction of a setup command. By executing this command using the URI obtained in 7107, a method for transmitting a stream including a session number is shared between the client apparatus 2000 and the monitoring camera 1000.

7110 denotes a transaction of a play command. By executing this command using the session number obtained in 7109, the client apparatus 2000 requests the monitoring camera 1000 to begin the stream.

7111 denotes a distributed stream. The monitoring camera 1000 distributes the stream requested to begin in 7110 using the transmission method shared in 7109.

7112 denotes a transaction of a teardown command. By executing this command using the session number obtained in 7109, the client apparatus 2000 requests the monitoring camera 1000 to stop the stream.

Figure 6:
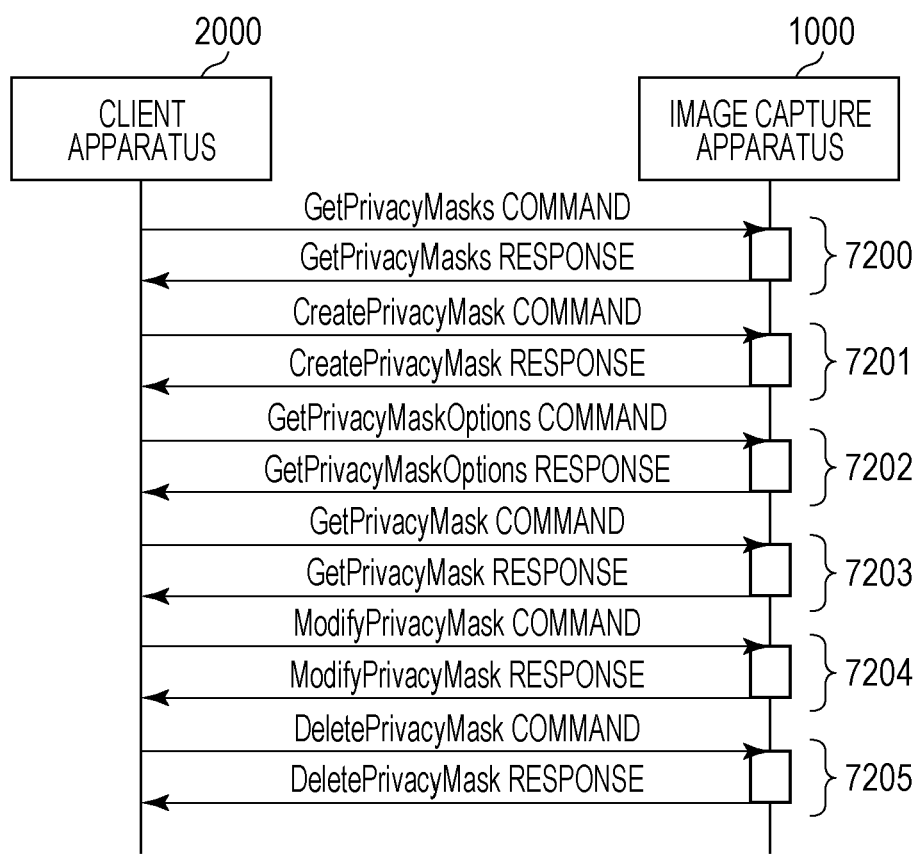
FIG. 6 is a diagram illustrating a command sequence.

FIG. 6A illustrates a typical command sequence for setting a mask between the monitoring camera 1000 and the client apparatus 2000 according to this embodiment.

7200 denotes a transaction of a get privacy masks command. The get privacy masks command is a command by which the client apparatus 2000 instructs the monitoring camera 1000 to send back privacy masks 6105. The privacy masks 6015 to be send back here are all the plurality of privacy masks 6105 associated with the specified video source configuration 6102 illustrated in FIG. 3A. A privacy mask 6105 is parameters that define the position and the size of a mask set on an image.

7201 denotes a transaction of a create privacy mask command. The create privacy mask command is a command by which the client apparatus 2000 instructs the monitoring camera 1000 to create a privacy mask 6105. As a result of this command, the privacy mask 6105 is created while being associated with the specified video source configuration 6102. That is, the create privacy mask command causes the monitoring camera 1000 to create a privacy mask, which is parameters that define a mask, while associating the privacy mask with the video source configuration, which is a setting used by the monitoring camera 1000 to distribute an image. The privacy mask 6105 is parameters that define the position and the size of a mask set on an image. By executing the create privacy mask command, the monitoring camera 1000 sends back a privacy mask token of the generated privacy mask to the client apparatus 2000. The storage unit 1002 holds a set position at which a mask image is superimposed upon a captured image as a privacy mask parameter. In addition, the storage unit 1002 holds one of the specified video source configurations.

7202 denotes a transaction of get privacy mask options command. The get privacy mask options command is a command by which the client apparatus 2000 instructs the monitoring camera 1000 to send back a selected range or options of each parameter of the privacy mask 6105. As a result of this command, the selected range or the options of each parameter of the privacy mask 6105 that may be selected using a modify privacy mask, which will be described later, is sent back. The privacy mask 6105 is parameters that define the position and the size of a mask set on an image. Thus, the get privacy mask options command is a command for obtaining settable options of a privacy mask, which is parameters that define a mask.

7203 denotes a transaction of a get privacy mask command. The get privacy mask command is a command by which the client apparatus 2000 instructs the monitoring camera 1000 to send back a privacy mask 6105 including a specified privacy mask token. As a result of this command, the privacy mask 6105 including the specified privacy mask token associated with the specified video source configuration 6102 is sent back. The privacy mask 6105 is parameters that define the position and the size of a mask set on an image.

7204 denotes a transaction of a modify privacy mask command. The modify privacy mask command is a command by which the client apparatus 2000 instructs the monitoring camera 1000 to edit each parameter included in the privacy mask 6105. By executing the modify privacy mask command, the monitoring camera 1000 edits the content of the privacy mask 6105 including the privacy mask token specified by the client apparatus 2000. As a result, the monitoring camera 1000 newly displays a mask or changes the color, the size, or the position of a mask that is being displayed. The privacy mask 6105 is parameters that define the position and the size of a mask set on an image. Details of processing of this command in the monitoring camera 1000 will be described later. In this embodiment, the modify privacy mask command is a first command that includes the specified information (token) regarding the video source configuration and the superimposition information (mask 5004) and that instructs superimposition of a mask image upon a captured image. The mask 5004 is superimposition information indicating a position at which a mask image is superimposed upon an image to be distributed generated on the basis of one of the video source configurations.

In this embodiment, the monitoring camera 1000 receives a second command (set video source configuration command) for causing the storage unit to hold settings specified by the client independently of the first command.

7205 denotes a transaction of a delete privacy mask command. The delete privacy mask command is a command by which the client apparatus 2000 instructs the monitoring camera 1000 to delete a privacy mask 6105 created as a result of the create privacy mask command. By executing the delete privacy mask command, the monitoring camera 1000 deletes a privacy mask 6105 including a privacy mask token specified by the client apparatus 2000 from a storage unit 1002. A privacy mask 6105 is parameters that define the position and the size of a mask set on an image.

Figure 9:
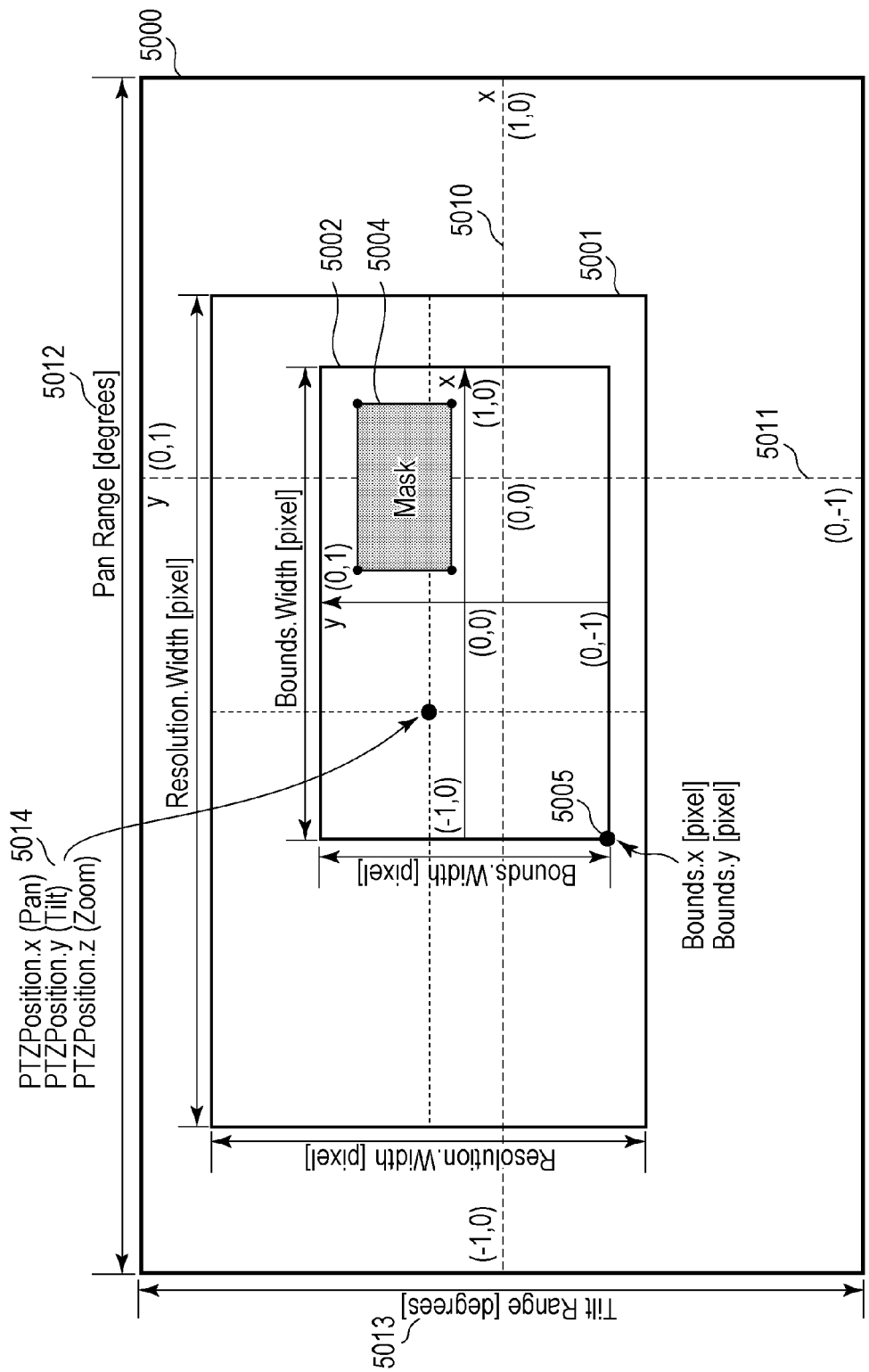
FIG. 9 is a diagram illustrating calculation of coordinates.

FIG. 9 illustrates a relationship between the following. In FIG. 9, the entirety of movable ranges 5012 and 5013 of the pan mechanism and the tilt mechanisms, respectively, the entirety of a visible range 5000, and image data 5001 output from the image capture unit 1003 at a certain zoom magnification in the monitoring camera 1000 according to this embodiment are included. Furthermore, in FIG. 9, an image to be distributed 5002 extracted using the bounds included in the video source configuration 6102 and the mask 5004 specified by the privacy mask 6105 are included.

The bounds are parameters that specify the height, the width, and the lower-left point of the image to be distributed 5002 in the image data 5001 using pixels. As illustrated in FIG. 5, the mask 5004 according to this embodiment is specified using three or more points plotted in a normalized coordinate system normalized to −1.0 to +1.0 in a horizontal direction (x) and a vertical direction (y) in the image to be distributed 5002 extracted using the bounds. The mask 5004 is superimposition information indicating a position at which a mask image is superimposed upon an image to be distributed generated on the basis of one of the video source configurations.

5014 denotes a central point of the image data 5001 specified by a PTZ position, the image data being output from the image capture unit 1003, and represented by a coordinate system specified by the PTZ configuration 6104. In this embodiment, the entirety of the ranges of the pan mechanism and the tilt mechanism are a normalized coordinate system normalized to −1.0 to +1.0 in a horizontal direction (x) 5010 and a vertical direction (y) 5011.

Figure 10:
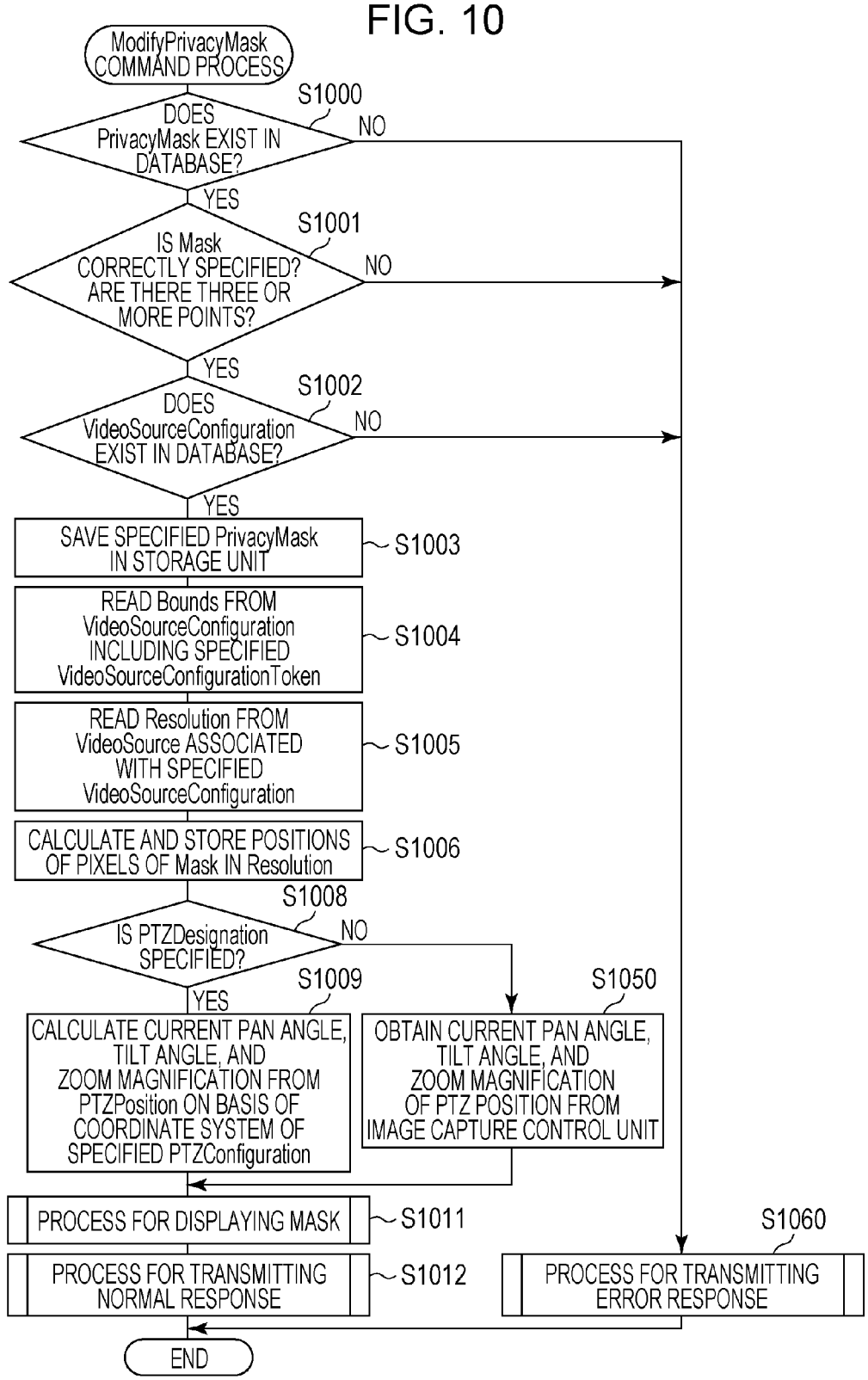
FIG. 10 is a flowchart illustrating a mask parameter process.

FIG. 10 illustrates the procedure of a process performed when the monitoring camera 1000 has received the modify privacy mask command from the client apparatus 2000. This procedure is part of a program read from the storage unit 1002 and executed by the control unit 1001, which is a computer. The storage unit 1002 is a storage medium that stores this program so that the control unit 1001, which is a computer, may read and execute the program.

In step S1000, the control unit 1001 determines whether or not a privacy mask 6105 including a privacy mask token specified in the received command exists in the storage unit 1002. If the privacy mask 6105 exists, the control unit 1001 causes the process to proceed to step S1060.

In step S1001, the control unit 1001 checks whether or not the mask included in the privacy mask 6105 is correctly set. For example, the control unit 1001 determines whether or not three or more points are included and whether or not each point is plotted in the image to be distributed 5002 in the normalized coordinate system defined by the bounds denoted by 5002 in FIG. 9. If the mask included in the privacy mask 6105 is not correctly set, the control unit 1001 causes the process to proceed to step S1060.

In step S1002, the control unit 1001 determines whether or not a video source configuration specified in the received command exists in the storage unit 1002. Whether or not the video source configuration exists is determined on the basis of whether or not a video source configuration including a video source configuration token specified in the command exists in the storage unit 1002. If the video source configuration does not exist, the control unit 1001 causes the process to proceed to step S1060.

In step S1003, the control unit 1001 causes the storage unit 1002 store the privacy mask specified in the received command.

In step S1004, the control unit 1001 reads the bounds from the video source configuration 6102 including the video source configuration token specified by the client apparatus 2000. The video source configuration 6102 including the video source configuration token specified by the client apparatus 2000 is stored in the storage unit 1002.

In step S1005, the control unit 1001 reads the resolution from a video source 6101 linked to (associated with) the video source configuration 6102 specified in the received command. The video source 6101 is linked to (associated with) the video source configuration 6102 including the video source configuration token specified in the received command.

In step S1006, the control unit 1001 calculates the position of a pixel of each point of the mask in the resolution on the basis of the bounds read in step S1004 and the resolution read in step S1005. In doing so, the control unit 1001 sets a position at which a mask image is superimposed upon a captured image on the basis of one of the video source configurations and the received superimposition information (mask 5004).

In step S1008, the control unit 1001 determines whether or not the PTZ designation is specified in the received command. If the PTZ designation is specified, the control unit 1001 causes the process to proceed to step S1009. If PTZ designation is not specified, the control unit 1001 causes the process to proceed to step S1050.

In step S1009, the control unit 1001 reads a coordinate system defined by pan, tilt, and zoom from a PTZ configuration 6104 identified by a PTZ configuration token specified in the PTZ designation. In this embodiment, the coordinate system is a normalized coordinate system in which the entirety of the ranges of the pan mechanism and the tilt mechanism are normalized to −1.0 to +1.0 in the horizontal direction (x) 5010 and the vertical direction (y) 5011. The media profile 6100 is held by the storage unit 1002. The control unit 1001 converts the values of pan, tilt, and zoom included in a PTZ position specified in the PTZ designation into the values of pan angle, tilt angle, and zoom magnification on the basis of the coordinate system.

On the other hand, in step S1050, the control unit 1001 obtains the current values of pan angle, tilt angle, and zoom magnification from the image capture control unit 1006.

In step S1011, the control unit 1001 executes a process for displaying a mask (details are omitted) using the following three as arguments. That is, the first argument is the positions of the pixels of the mask in the resolution calculated in step S1006. The second argument is the values of pan angle, tilt angle, and zoom magnification obtained in step S1009 or step S1050. The third argument is the state of the enabled flag included in the received command. The control unit 1001 sets the position at which the mask image is superimposed in the image capture possible range on the basis of one of the video source configurations, the superimposition information indicating the position at which the mask image is superimposed upon an image to be distributed generated on the basis of the one of the video source configurations, and the PTZ positional information.

In the process for displaying a mask, the control unit 1001 inputs the arguments received in step S1011 to the mask processing unit 1007. As described above, the mask processing unit 1007 provides a mask for an image to be distributed on the basis of the input data and the latest values of pan angle, tilt angle, and zoom magnification. The control unit 1001 sets a mask image on an image using the media profile, which is media attribute information including the video source configuration.

In step S1012, the control unit 1001 executes a process for transmitting a normal response (details are omitted). In the process for transmitting a normal response, the control unit 1001 transmits a normal response to the client apparatus 2000 through the communication unit 1004 in response to the received command.

In step S1060, the control unit 1001 executes a process for transmitting an error response (details are omitted). In the process for transmitting an error response, the control unit 1001 transmits an error response to the client apparatus 2000 through the communication unit 1004 in response to the received command.

According to the process for setting a mask according to this embodiment described above, the monitoring camera 1000 is able to hold parameters for realizing a mask processing function in accordance with a common standard established by the ONVIF. In addition, the client apparatus 2000 that supports the common standard established by the ONVIF is able to set the mask processing function, which is an advantageous effect.

Second Embodiment

In the first embodiment, an embodiment of the present invention has been described with reference to a security camera that holds a privacy mask, which is parameters for the mask processing function, while associating the privacy mask with the video source configuration.

In the first embodiment, however, since the privacy mask is held as a unique parameter, a plurality of dedicated commands for handling the privacy mask including the create privacy mask command are newly required, but the present invention is not limited to this. That is, the mask processing function may be realized in the following manner. That is, a known command that handles the video source configuration may be used by holding the privacy mask as parameters belonging to the video source configuration. A second embodiment of the present invention that takes into consideration the above point will be described hereinafter. It is to be noted that description of the same components as those according to the first embodiment is omitted.

FIG. 3B illustrates the structure of parameters held by a monitoring camera (image capture apparatus) 1000 according to this embodiment.

A video source configuration 6200 is a group of parameters that associate a video source 6101 included in the monitoring camera with a media profile 6100. The video source configuration 6200 includes bounds that specify a portion of image data output from the video source 6101 to be extracted and used as an image to be distributed. Details of the bounds will be described later. The video source configuration 6200 also includes a privacy mask 6201.

The privacy mask 6201 is a group of parameters that hold a list of parameters relating to a mask. The privacy mask 6201 includes a name, which is the name of the privacy mask, a mask, which specifies the position and the size of the mask at three or more points using a polygon, and an enabled flag, which specifies whether or not to display the mask on an image to be distributed. Furthermore, the privacy mask 6201 includes a color, which specifies the color of the mask, and PTZ designation, which identifies the position of a pan head. Thus, the privacy mask, which is parameters that define the position and the size of a mask set on an image, is held as parameters belonging to the video source configuration, which is a setting used by the monitoring camera to distribute an image.

Figure 7A:
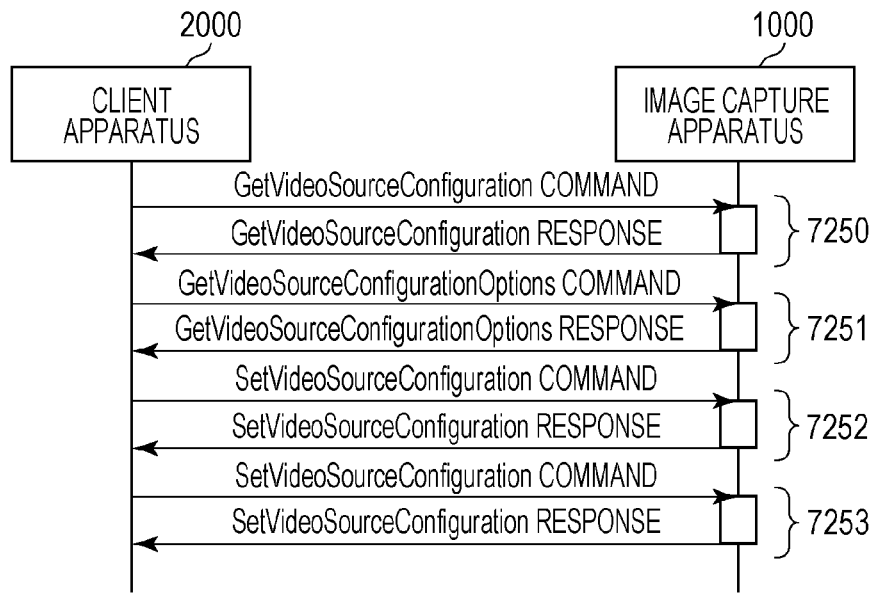
FIGS. 7A and 7B illustrate a command sequence.

FIG. 7A illustrates a typical command sequence for setting a mask between the monitoring camera 1000 and a client apparatus 2000 according to this embodiment.

7250 denotes a transaction of a get video source configuration command. The get video source configuration command is a command by which the client apparatus 2000 instructs the monitoring camera 1000 to send back the video source configuration. The get video source configuration command causes the client apparatus 2000 to obtain editable options of the parameters that define the position and the size of a mask set on an image. As a result of this command, all video source configurations including the privacy mask 6201 illustrated in FIG. 3A are sent back.

7251 denotes a transaction of get video source configuration options command. The get video source configuration options command is a command by which the client apparatus 2000 issues the following instructions to the monitoring camera 1000. One of the instructions is an instruction to send back a selection range or options of each parameter of the video source configuration 6200 that may be set by a set video source configuration command, which will be described later. Another of the instructions is an instruction to send back a selection range or options of each parameter of the privacy mask 6201 included in the video source configuration 6200. The get video source configuration options command causes the client apparatus 2000 to obtain settable options of the parameters that define the position and the size of a mask set on an image. As described above, the get video source configuration options command is a command for obtaining settable options of the parameters that define the position and the size of a mask set on an image.

7252 denotes a transaction of a set video source configuration command. The set video source configuration command is a second command for causing a storage unit to hold settings specified by the client. The set video source configuration command is a command by which the client apparatus 2000 issues the following instruction to the monitoring camera 1000. That is, the instruction is an instruction to edit the video source configuration 6200 and the parameters of the privacy mask 6201 included in the video source configuration 6200. By executing the set video source configuration, the monitoring camera 1000 edits the content of a privacy mask 6201 specified by the client apparatus 2000. As a result of the editing, the monitoring camera 1000 newly displays a mask or changes the color, the size, or the position of a mask that is being displayed. Thus, the set video source configuration command causes the monitoring camera 1000 to create, edit, or delete the parameters that define the position and the size of a mask set on an image. Details of processing of this command in the monitoring camera 1000 will be described later. The monitoring camera 1000 according to the second embodiment receives specification information and superimposition information included in the command (set video source configuration command) for causing a storage unit 1002 to hold settings specified by the client. In this embodiment, the specification information is information for specifying a video source configuration to be set. In addition, in this embodiment, the superimposition information is information that specifies editing of the content of a privacy mask 6201.

The storage unit 1002 holds a position at which a mask image is superimposed upon a captured image while including the position in a specified video source configuration.

Figure 11:
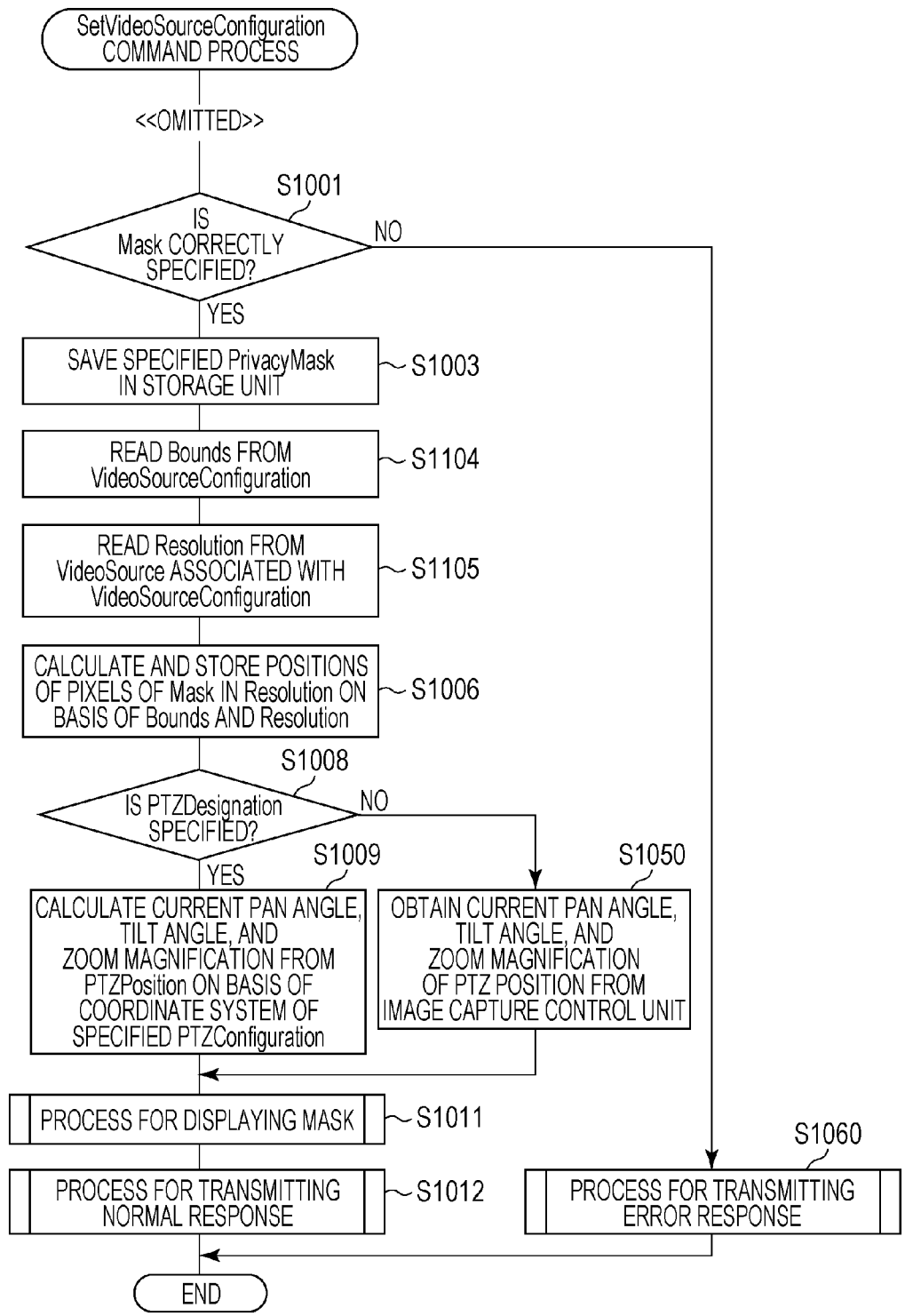
FIG. 11 is a flowchart illustrating a mask parameter process.

FIG. 11 illustrates a process performed when the monitoring camera 1000 has received the above-described set video source configuration command from the client apparatus 2000. In this process, description of a setting process relating to parameters other than the privacy mask 6201 included in the video source configuration 6200 is omitted. In addition, processing relating to steps S1001 to S1060 is the same as that illustrated in FIG. 10, and accordingly description thereof is omitted.

In step S1104, the control unit 1001 reads the bounds from a video source configuration that is being subjected to the setting process.

In step S1105, the control unit 1001 reads the resolution from a video source 6101 linked to (associated with) the video source configuration 6200 specified in the received command. The specified video source configuration 6200 is a video source configuration 6200 including a video source configuration token specified in the received command.

The control unit 1001 sets a mask on an image to be distributed using a media profile, which is media attribute information including the video source configuration.

According to the above-described mask setting process according to this embodiment, the monitoring camera 1000 is able to cause the client apparatus 2000 that supports the common standard established by the ONVIF to set the mask processing function without adding a new command, which is an advantageous effect.

Third Embodiment

In the first and second embodiments, embodiments of the present invention have been described with reference to security cameras that hold a privacy mask, which is parameters for the mask processing function, while associating the privacy mask with the video source configuration.

Although, however, the privacy mask is held as parameters belonging to the video source configuration in the first and second embodiment, the present invention is not limited to this. Presence or absence of a privacy mask may be changed for each media profile by holding the privacy mask while associating the privacy mask with each media profile, instead.

A third embodiment of the present invention that takes into consideration the above point will be described hereinafter. It is to be noted that description of the same components as those according to the first embodiment is omitted.

Figure 4A:
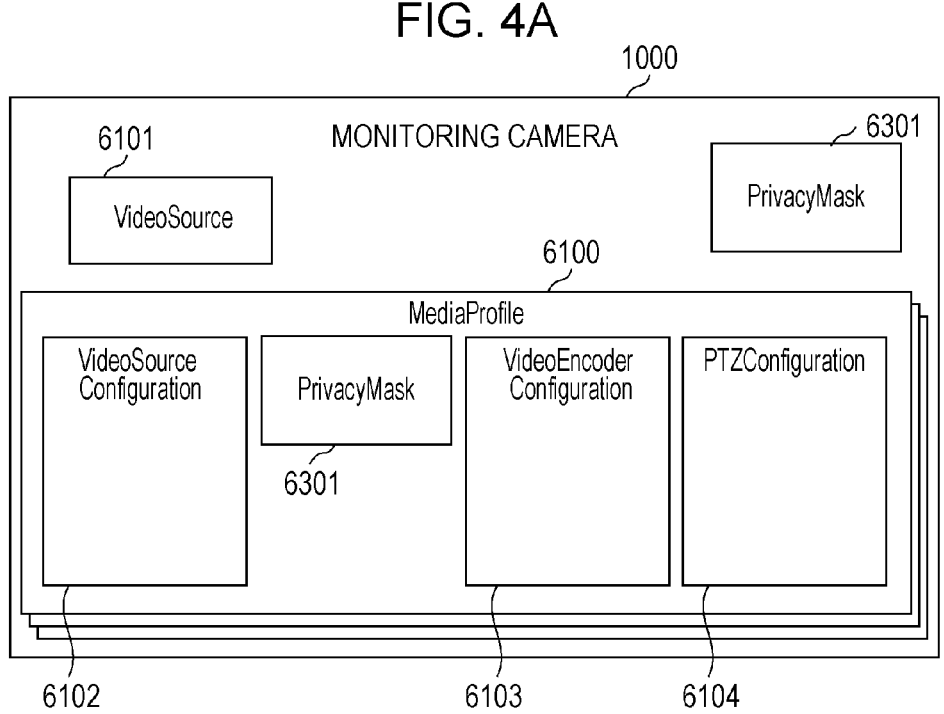
FIGS. 4A and 4B illustrate the structure of parameters.

FIG. 4A illustrates the structure of parameters held by a monitoring camera 1000 according to this embodiment.

A privacy mask 6301 is a group of parameters that hold a list of parameters relating to a mask. The privacy mask 6301 includes a privacy mask token, which is an ID of the privacy mask 6301 and a name, which is the name of a privacy mask construction. Furthermore, the privacy mask 6301 includes a mask, which specifies the position and the size of the mask at three or more points using a polygon, an enabled flag, which specifies whether or not to display the mask on an image to be distributed, and a color, which specifies the color of the mask. Furthermore, the privacy mask 6301 includes PTZ designation, which identifies the position of a pan head. The privacy mask 6301 may be added to a media profile 6100 by an add privacy mask command, which will be described later. In addition, the privacy mask 6301 may be removed from a media profile 6100 by a remove privacy mask command, which will be described later. A mask process by the privacy mask 6301 is performed only on an image to be distributed using a media profile 6100 added by the add privacy mask command.

Figure 7B:
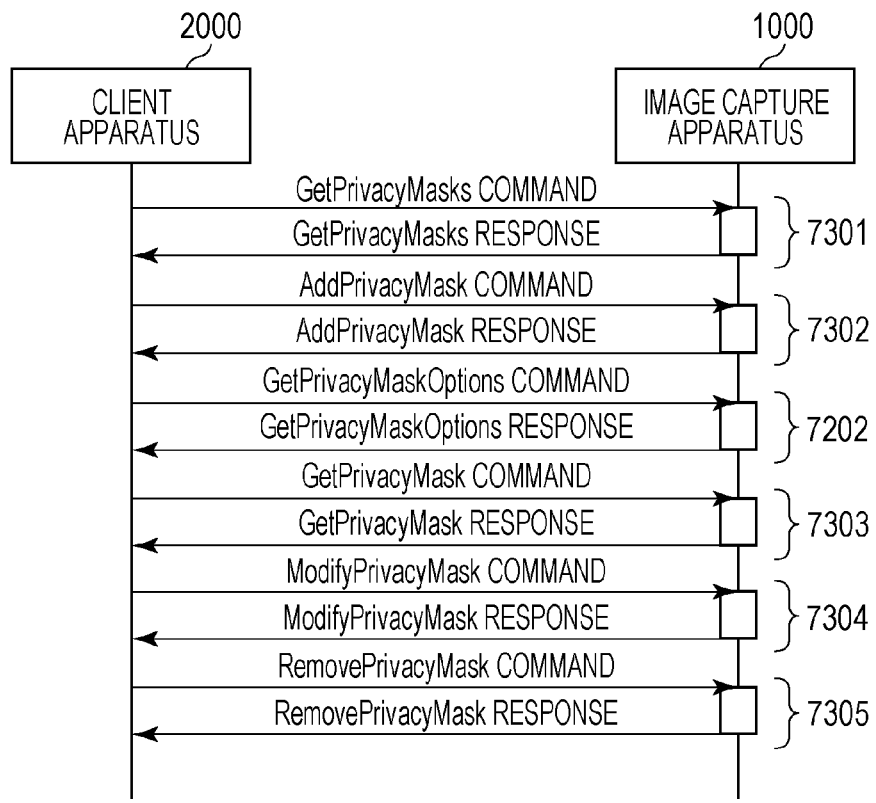

FIG. 7B illustrates a typical command sequence for setting a mask between the monitoring camera 1000 and a client apparatus 2000 according to this embodiment.

7301 denotes a transaction of a get privacy masks command. The get privacy masks command is a command by which the client apparatus 2000 instructs the monitoring camera 1000 to send back all a plurality of privacy masks 6301. That is, the get privacy masks command is a command for obtaining the plurality of privacy masks 6301.

7302 denotes a transaction of an add privacy mask command. The add privacy mask command is a command by which the client apparatus 2000 instructs the monitoring camera 1000 to add a privacy mask 6301 to a specified media profile 6100. That is, the add privacy mask command is a command for adding a privacy mask, which is parameters that define a mask, to a media profile, which is media attribute information.

7303 denotes a transaction of a get privacy mask command. The get privacy mask command is a command by which the client apparatus 2000 instructs the monitoring camera 1000 to send back a privacy mask 6301 including a specified privacy mask token. That is, the get privacy mask is a command for obtaining a certain privacy mask.

7304 denotes a transaction of a modify privacy mask command. The modify privacy masks command is a command by which the client apparatus 2000 instructs the monitoring camera 1000 to edit each parameter included in a privacy mask 6301. By executing the modify privacy mask, the monitoring camera 1000 edits the content of a privacy mask 6301 including a privacy mask token specified by the client apparatus 2000. As a result of the editing, the monitoring camera 1000 newly displays a mask or changes the color, the size, or the position of a mask that is being displayed. Details of processing of this command in the monitoring camera 1000 will be described later.

7305 denotes a transaction of a remove privacy mask command. The remove privacy mask command is a command by which the client apparatus 2000 instructs the monitoring camera 1000 to remove a privacy mask 6301 from a specified media profile 6100. By executing the remove privacy mask command, the privacy mask 6301 enters a state in which the privacy mask 6301 is not added to any media profile 6100. That is, the remove privacy mask command is a command for removing a privacy mask, which is parameters that define a mask, from the media profile.

Figure 12:
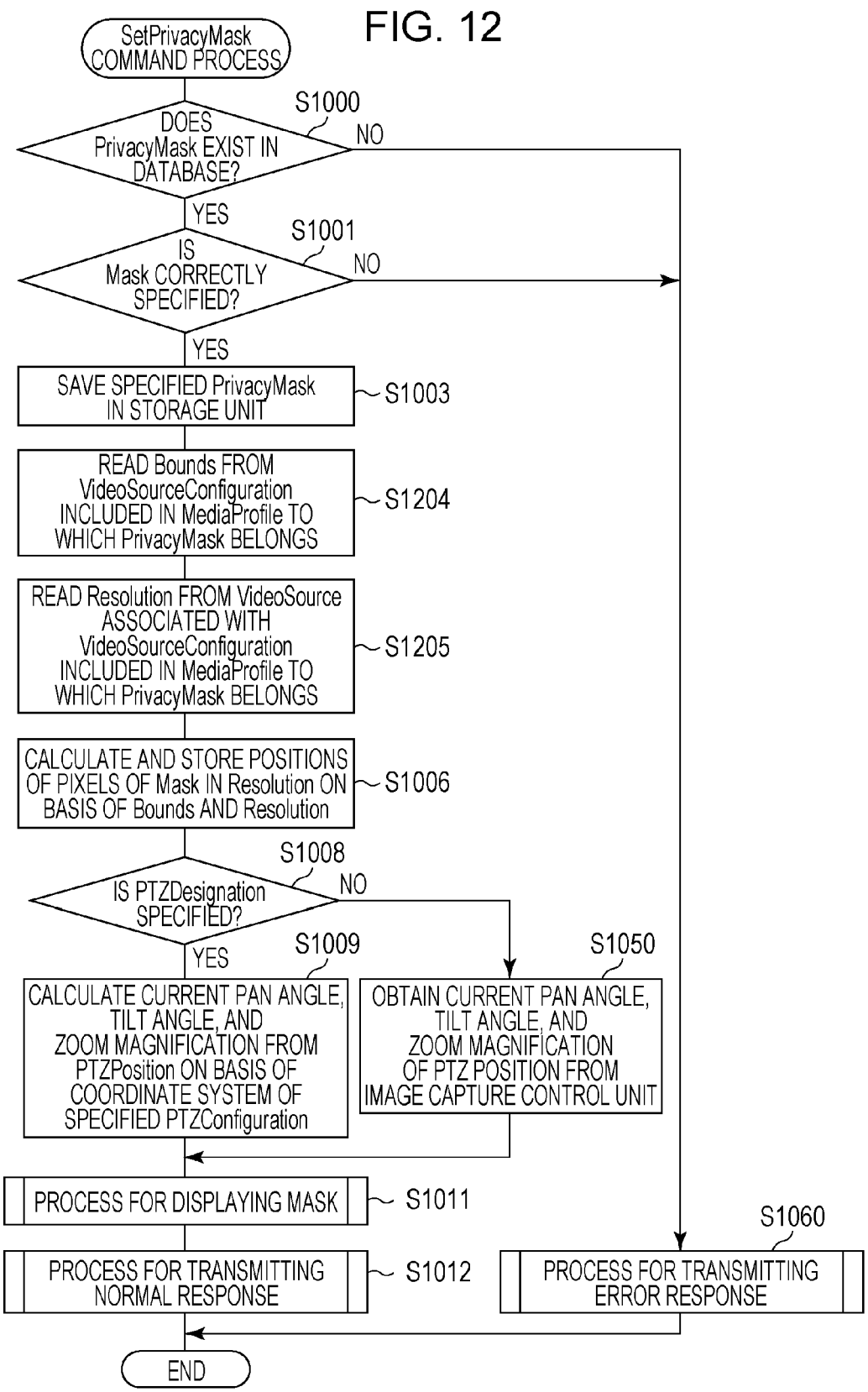
FIG. 12 is a flowchart illustrating a mask parameter process.

FIG. 12 illustrates a process performed when the monitoring camera (image capture apparatus) 1000 has received the set privacy mask command from the client apparatus 2000. In this process, processing relating to steps S1001 to S1060 is the same as that illustrated in FIG. 10, and accordingly description thereof is omitted. The set privacy mask command is a command for holding a privacy mask, which is parameters that define a mask, as independent parameters in the monitoring camera 1000 and editing the parameters.

In step S1204, the control unit 1001 reads the bounds from a video source configuration 6102 that includes the privacy mask and that has been added to the media profile 6100.

In step S1105, the control unit 1001 reads the resolution from a video source 6101 linked to (associated with) the video source configuration 6102. The video source configuration 6102 is a video source configuration 6102 that includes the privacy mask and that has been added to the media profile 6100.

The control unit 1001 sets a mask on an image to be distributed using the media profile 6100 to which the privacy mask 6301, which is parameters that define a mask, has been added.

According to the above-described mask setting process according to this embodiment, the monitoring camera 1000 is able to hold parameters that realize the mask processing function in accordance with the common standard established by the ONVIF as with the first and second embodiments. In addition, the client apparatus 2000 is able to select whether or not to add the mask process for each media profile, which is an advantageous effect.

Fourth Embodiment

In the third embodiment, an embodiment of the present invention has been described with reference to a security camera that holds a privacy mask, which is parameters for the mask processing function, while associating the privacy mask with a media profile.

Although, however, the privacy mask is held while being associated with the video source configuration, the media profile, or the like in the first to third embodiments, the present invention is not limited to this. The privacy mask may be held by the monitoring camera 1000 as independent parameters, instead.

A fourth embodiment of the present invention that takes into consideration the above point will be described hereinafter. It is to be noted that description of the same components as those according to the first, second, and third embodiments is omitted.

Figure 4B:
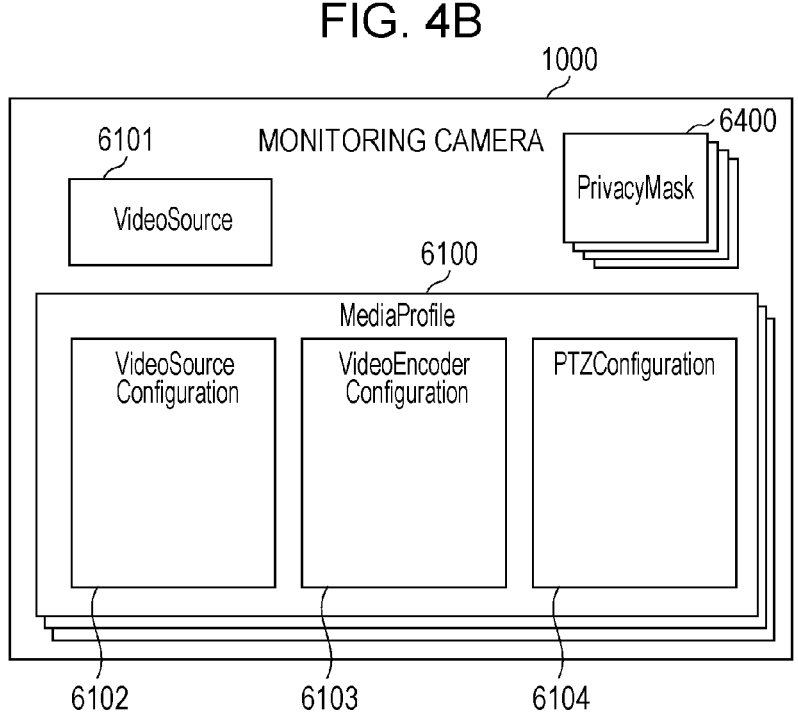

FIG. 4B illustrates the structure of parameters held by a monitoring camera (image capture apparatus) 1000 according to this embodiment.

A privacy mask 6400 is a group of parameters that hold a list of parameters relating to a mask. The privacy mask 6400 includes a privacy mask token, which is an ID of the privacy mask 6400, a name, which is the name of a privacy mask construction, and a mask, which specifies the position and the size of the mask at three or more points using a polygon. The privacy mask 6400 includes an enabled flag, which specifies whether or not to display the mask on an image to be distributed, a color, which specifies the color of the mask, and PTZ designation, which identifies the position of a pan head. The privacy mask 6400 is valid in all images to be distributed streamed from the monitoring camera 1000, and display or non-display of a mask is controlled by the enabled flag in a modify privacy mask command. Thus, a privacy mask, which is parameters that define a mask, is held by the monitoring camera 1000 as independent parameters.

A storage unit 1002 according to this embodiment may hold a plurality of video source configurations.

Figure 8:
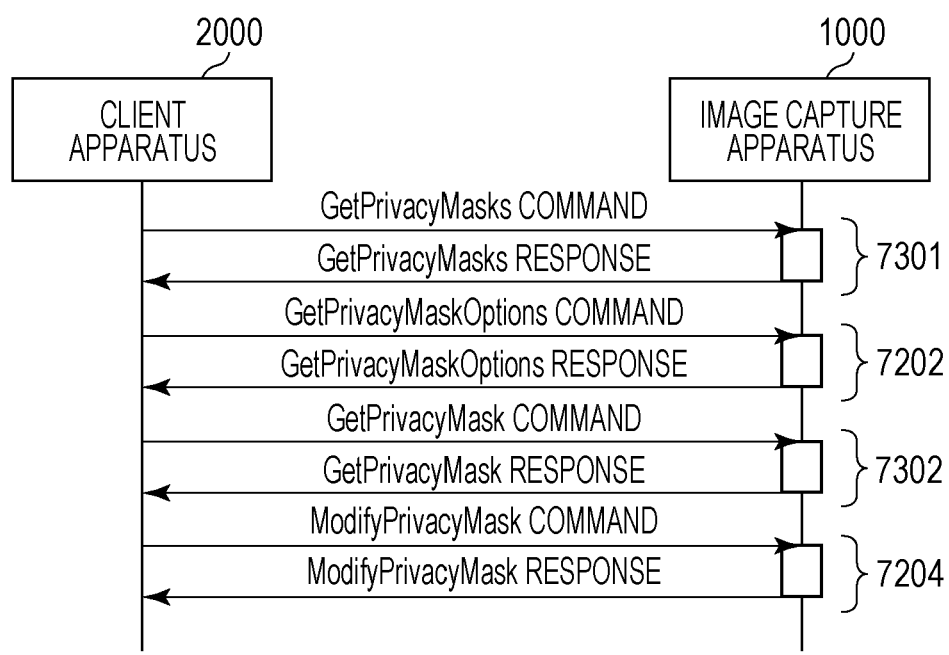
FIG. 8 is a diagram illustrating a command sequence.

FIG. 8 illustrates a typical command sequence for setting a mask between the monitoring camera 1000 and the client apparatus 2000 according to this embodiment. Each transaction is as described above.

A get privacy mask options command is a command for obtaining settable options of a privacy mask, which is parameters that define a mask. A get privacy mask command is a command for obtaining a certain privacy mask. A modify privacy masks command is a command for editing a privacy mask, which is parameters that define a mask.

In addition, a create privacy mask command is a command for creating a privacy mask, which is parameters that define a mask. A delete privacy masks command is a command for deleting a privacy mask, which is parameters that define a mask. A get privacy masks command is a command for obtaining all a plurality of privacy masks.

A control unit 1001 sets masks on all images to be distributed from the monitoring camera 1000. For example, when the storage unit 1002 holds a plurality of sets of video source configurations, the control unit 1001 sets masks on a plurality of images to be distributed generated in accordance with the plurality of sets of video source configurations.

According to the above-described process for setting a mask according to this embodiment, the monitoring camera 1000 is able to hold parameters that realize the mask processing function in accordance with the common standard established by the ONVIF as with the first, second, and third embodiments. In addition, the mask process may be applied to all images to be distributed from the monitoring camera 1000 regardless of all media settings relating to a media profile, which is an advantageous effect.

Although the operations of the security cameras on which the present invention is mounted and the application programs have been described in the first to fourth embodiments, embodiments are not necessarily limited to the above-described embodiments, and part of the above-described embodiments may be modified. That is:

(1) Although the mask processing unit 1007 uses the pan angle, the tilt angle, the zoom magnification, and the positions of pixels of a mask in the image capture range of the image capture unit 1003 in the corresponding pan, tilt, and zoom states as input information, the present invention is not limited to this. The input information may be modified insofar as the amount of information is large enough to uniquely identify the position of a mask in accordance with the function of the mask processing unit. For example, with respect to the pan and tilt angles, coordinate values may be input instead of angles. Alternatively, a mask processing unit 1007 that does not allow input of the pan angle, the tilt angle, and the zoom magnification from the outside and that identifies the position of a mask on the basis of only the current position of the image capture unit 1003 may be used. In this case, the PTZ designation cannot be specified from the client apparatus 2000.

(2) Although a privacy mask is associated with a video source configuration when the privacy mask is created by the create privacy mask command in the first embodiment, the present invention is not limited to this. The create privacy mask command need not receive a video source configuration token as an argument, and, for example, another command such as the add privacy mask command may associate a privacy mask with a video source configuration.

(3) Although the parameters are configured such that masks are applied to all images to be distributed regardless of the settings of a media profile in the fourth embodiment, the present invention is not limited to this. In a modification, a parameter that receives a media profile token of a media profile for distributing an image without applying a mask, a stream URI, or user information is supported in a privacy mask. In addition, in the modification, a mask is not provided for an image to be distributed that satisfies the parameter. That is, a privacy mask, which is parameters that define a mask, further holds an exception distribution parameter that defines a distribution method in which the mask process is not performed, and an image to be distributed specified by the exception distribution parameter is not subjected to the mask process.

OTHER EMBODIMENTS

An embodiment of the present invention may be realized by a computer of a system or an apparatus that reads and executes a computer-executable command recorded on a recording medium (for example, a computer-readable storage apparatus that does not perform temporary recording). By executing the command using the computer, at least one of the above-described embodiments of the present invention is realized.

In addition, an embodiment of the present invention may be realized using a method executed by a computer of a system or an apparatus. For example, at least one of the above-described embodiments of the present invention is realized by reading a computer-executable command from a recording medium.

The computer may be configured by one or more central processing units (CPUs), microprocessing units (MPUs), or other circuits. Alternatively, the computer may be configured by a separated computer network or a separated computer processor.

The computer-executable command is, for example, provided for the computer through a network or from the recording medium. The recording medium may be, for example, one or more hard disks, random-access memories (RAMs), read-only memories (ROMs), distributed storages of a computing system, optical disks (for example, compact discs (CDs), digital versatile discs (DVDs), or Blu-ray Discs (BDs) (registered trademark)), flash memories, memory cards, or the like.

According to the transmission apparatus in the present invention, an image capture apparatus, a method for capturing an image, and a recording medium that are suitable to superimpose a mask image upon a captured image using camera parameters used for generating the captured image and parameters for setting a mask are provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A transmission apparatus that transmits an image to be distributed, which is at least a part of a captured image by an image capture unit, to a reception apparatus, the transmission apparatus comprising:
 a holding unit configured to hold at least one setting including an extraction range to extract a distribution image from the captured image and a resolution of the captured image;
 a determination unit configured to receive, from a reception apparatus, specification information for specifying one of the at least one setting in the holding unit and to apply a coordinate system corresponding to an extraction range of the distribution image, the extraction range being determined by the specified setting;
 a setting unit configured to receive, from the reception apparatus, mask position information indicating a mask position in the determined coordinate system for displaying a mask in the distributed image and set the mask position, based on the resolution of the captured image, the extraction range and the received mask position in the determined coordinate system, at which the mask is displayed in the distribution image extracted from the captured image; and
 a transmission unit configured to transmit the distribution image with the mask to a reception apparatus by extracting the distribution image within the extraction range of the captured image.

2. The transmission apparatus according to claim 1, further comprising:
 the image capture unit configured to capture the captured image by changing an image capturing direction,
 wherein the holding unit holds positional information for identifying a position of the captured image in an image capture possible range, in which the image capture unit is able to capture an image.

3. The transmission apparatus according to claim 1,
 further comprising a reception unit to receive a first command that includes the position information and that causes the mask image to be displayed in the distribution image and a second command for causing the holding unit to hold the setting specified by the reception apparatus.

4. The transmission apparatus according to claim 1, wherein the position information is included in a command for causing the holding unit to hold the setting specified by the reception apparatus.

5. The transmission apparatus according to claim 1, wherein the holding unit holds the mask position, pixel by pixel, at which the mask image is displayed in the distribution image set by the setting unit and the specified one of the settings.

6. The transmission apparatus according to claim 1, wherein the holding unit holds the mask position at which the mask image is displayed in the captured image set by the setting unit while including the mask position in the specified one of the settings.

7. The transmission apparatus according to claim 1, wherein the holding unit holds a media profile used for generating the image to be distributed and a setting used for determining an image capture direction of an image capture unit that captures the captured image and the position at which the mask image is displayed in the distribution image set by the setting unit while including the mask position in the media profile.

8. The transmission apparatus according to claim 1, further comprising a superimposition unit configured to cause the holding unit to hold the mask position set by the setting unit and make settings such that the mask is superimposed upon the distribution image.

9. A method for controlling a transmission apparatus that transmits an image to be distributed, which is at least a part of a captured image by an image capture unit, to a reception apparatus and that holds at least one setting including an extraction range to extract a distribution image from the captured image and a resolution of the captured image:
receiving, from the reception apparatus, specification information for specifying one of the at least one setting;
applying a coordinate system to an extraction range of the distribution image, the extraction range being determined by the specified setting;
receiving, from the reception apparatus, mask position information indicating a mask position in the determined coordinate system for displaying a mask in the distribution image;
setting a mask position, based on the resolution of the captured image, the extraction range and the received mask position in the determined coordinate system, at which the mask is displayed in the distribution image extracted from the captured image; and
transmitting the distribution image with the mask to a reception apparatus by extracting the distribution image within the extraction range of the captured image.

10. A non-transitory recording medium storing a program for causing a computer that transmits an image to be distributed, which is at least a part of a captured image by an image capture unit, to a reception apparatus and that holds at least one setting including an extraction range to extract a distribution image from the captured image and a resolution of the captured image to execute procedures comprising:
a procedure for receiving, from the reception apparatus, specification information for specifying one of the settings;
a procedure for applying a coordinate system to an extraction range of the distribution image, extraction range being determined by the specified setting;
a procedure for setting a mask position, based on the resolution of the captured image, the extraction range and the received mask position in the determined coordinate system, at which the mask is displayed in the distribution image extracted from the captured image; and
a procedure for transmitting the distribution image with the mask to a reception apparatus by extracting the distribution image within the extraction range of the captured image.

11. The method according to claim 9, wherein the image capture unit captures an image by changing an image capturing direction, and positional information is held for identifying a position of the captured image in an image capture possible range, in which the image capture unit is able to capture an image.

12. The non-transitory recording medium according to claim 10, wherein the image capture unit captures an image by changing an image capturing direction, and positional information is held for identifying a position of the captured image in an image capture possible range, in which the image capture unit is able to capture an image.

* * * * *